United States Patent [19]
Ambler

[11] Patent Number: 5,827,583
[45] Date of Patent: Oct. 27, 1998

[54] BARRIER PACKAGE

[75] Inventor: David M. Ambler, Petaluma, Calif.

[73] Assignee: Sola International, Inc., Menlo Park, Calif.

[21] Appl. No.: 390,879

[22] Filed: Feb. 17, 1995

[30] Foreign Application Priority Data

Feb. 28, 1994 [GB] United Kingdom ............... 9403829

[51] Int. Cl.⁶ ...................... B65D 85/38; B65B 1/04
[52] U.S. Cl. ...................... 428/35.2; 428/35.3; 428/35.4; 428/35.9; 428/458; 428/447; 428/461; 428/516; 428/689; 428/702; 206/5; 206/316.1; 206/484; 383/94; 383/113; 53/449; 53/453; 53/469
[58] Field of Search ............. 206/316.1, 5, 484, 206/5.1; 383/113, 94; 351/166, 41; 428/35.3, 35.9, 458, 461, 516, 447, 689, 702, 35.2, 35.4; 53/453, 449, 469

[56] References Cited

U.S. PATENT DOCUMENTS

| | | | |
|---|---|---|---|
| 3,991,234 | 11/1976 | Chang et al. | 351/166 |
| 4,177,894 | 12/1979 | Petersen | 206/316.1 |
| 4,261,656 | 4/1981 | Wu | 351/166 |
| 4,547,397 | 10/1985 | Burzynski et al. | 351/166 |
| 4,632,527 | 12/1986 | Masso et al. | 351/166 |
| 4,645,317 | 2/1987 | Freider et al. | 351/134 |
| 4,867,553 | 9/1989 | Freider | 351/172 |
| 4,906,517 | 3/1990 | Akao et al. | 428/516 |
| 5,006,378 | 4/1991 | Itaba et al. | 428/461 |
| 5,023,120 | 6/1991 | Akao | 428/35.9 |
| 5,110,643 | 5/1992 | Akao et al. | 428/35.9 |
| 5,149,181 | 9/1992 | Bedford | 351/166 |
| 5,220,358 | 6/1993 | Brown et al. | 351/166 |
| 5,333,732 | 8/1994 | Budny et al. | 206/5 |

FOREIGN PATENT DOCUMENTS

| | | |
|---|---|---|
| 0507351 | 1/1988 | European Pat. Off. . |
| 0508489 | 1/1988 | European Pat. Off. . |
| 0317237 | 11/1988 | European Pat. Off. . |
| 58 162 901 | 12/1983 | Japan . |
| 60 150 001 | 12/1985 | Japan . |
| 2260937 | 5/1993 | United Kingdom . |

OTHER PUBLICATIONS

*Automotive Engineering* (May 5, 1993) "Coatings for plastic glazing" Warrendale, PA, US 101(5):24–28.
Derwent Abstract of Japanese Patent Application 02109869, Abstract No. 90–168314.

*Primary Examiner*—Rena L. Dye
*Attorney, Agent, or Firm*—Burns, Doane, Swecker & Mathis, L.L.P.

[57] ABSTRACT

A barrier package for the storage of lens wafers used in fabricating laminated lenses, comprises a package adapted to be sealed to enclose therein a lens wafer and formed of a multilayer material, including a metallic layer, of low moisture transmission rate, so that conditions of humidity inside the sealed package are substantially isolated from humidity conditions external of the package. Lens wafers so stored exhibit minimum distortions to interface curvature. Instead of or in addition to being stored in a barrier package, the lens wafers can also be coated with a moisture barrier coating to achieve isolation from external humidity fluctuations. The moisture equilibrated precision lens wafers are suitable for use in optical devices.

36 Claims, 4 Drawing Sheets

BARRIER PACKAGE

FIELD OF THE INVENTION

The present invention relates to a moisture barrier package for the storage of lens wafers of the type which are laminated together to form lenses, particularly ophthalmic lenses, and to a method of storing lens wafers to minimize curvature changes.

BACKGROUND OF THE INVENTION

Ophthalmic lenses have traditionally been formed as a single integral body of glass or plastic. Grinding or molding such lenses to meet the specifications of a particular prescription requires costly equipment, highly skilled technicians, and considerable time. It has been found that the fabrication of ophthalmic lenses can be economically accomplished in a more rapid manner with a laminated lens construction in which two lens wafers are bonded together with a transparent adhesive. Each lens wafer has two surfaces, an anterior surface and a posterior surface, that are generally curve-shaped. Typically in fabricating laminated ophthalmic lenses comprising dual lens wafers, the anterior surface of one wafer is bonded to the posterior surface of another so the contours of these interface surfaces must match. In principle, both the anterior and posterior surfaces for any given lens wafer could serve as the bonding or interface surface. To assure that lamination produces ophthalmic lenses having the desired prescription, it is important that the lens wafer surfaces not become distorted from their original configurations. Lens wafers are described, for example, in U.S. Pat. Nos. 5,149,181, 4,867,553, and 4,645,317 and UK Patent Application, GB 2,260,937A.

The laminate construction enables assembly of lenses having any of a large number of different combinations of optical parameters from a relatively small stock of prefabricated lens wafers of different configurations. Pairing of different combinations of the wafers can, for example, provide lenses having any of a large number of different powers as the power of the lens is the summation of the powers of the two wafers.

Eye care professionals have, however, encountered problems with such lens wafers. It has been found that lenses of a predetermined optical power cannot consistently be produced, that the final power of the complete lens deviates from the required power, and that it is not possible to adequately predict the final power. It has been found that this power deviation in part can be attributed to changes in the shape of the lens wafers subsequent to their manufacture, and prior to their lamination together to form the final lenses, and in particular to the change in curvature of the surfaces which lie together in the final lens, i.e., the interface surfaces.

SUMMARY OF THE INVENTION

The present invention provides lens wafers which produce laminated ophthalmic lenses having the desired power by minimizing their level of curvature instability. Such lens wafers are produced by encapsulating the wafer in a moisture barrier package or in a film coating where the wafer is stored until ready for use. Storing lens wafers in such a manner significantly reduces the exposure of the wafers to changes in ambient humidity. An aspect of the invention is that it provides moisture equilibrated precision lens wafers for use in optical devices.

A feature of the invention is that the inventive moisture barrier package or film promotes the uniform distribution of moisture in the lens wafer. Further, once the moisture level in the lens wafer has equilibrated, the moisture content remains uniformly distributed within the package even though the relative humidity in the outside environment may fluctuate. The result is that the encapsulated lens wafer has a consistent optical curvature and that laminated lenses made from encapsulated lens wafers have the required power.

Accordingly, in one of its compositional aspects, the invention preferably relates to a package suitable for storing lens wafers comprising: a multilayer barrier material comprising a metal layer and a sealable inner layer, said multilayer barrier material defining a sealable pocket adapted to enclose the lens wafer therein, said multilayer barrier material having a water vapor transmission rate that is less than about 0.005 grams/100 sq. in./day.

In another of its compositional aspects, the invention also relates to a lens wafer that has a moisture barrier film that has a water vapor transmission rate that is less than about 0.005 grams/100 sq. in./day at 90% relative humidity and 100° F. In one embodiment, the moisture barrier is coated onto the lens wafer.

The invention is also directed to a method of maintaining a lens wafer at its original predetermined optical power (e.g., initial interface curvature after manufacture) by either storing the lens wafer in a moisture barrier package or coating the lens wafer with a moisture resistant coating (e.g., film). This assures that the lens wafers will be distortion free when they are laminated to form ophthalmic lenses.

Further, in another of its method aspects, the invention relates to a method of inhibiting changes in the curvature of a lens wafer occurring after manufacture of the wafer and prior to lamination into an ophthalmic lens, which method comprises:

1) providing a package formed of a substantially water impermeable material that defines a sealable pocket adapted to enclose the lens wafer therein;

2) inserting the lens wafer inside said enclosure; and 3) sealing the pocket to enclose the lens wafer therein whereby the lens wafer is maintained in a humidity environment which is substantially isolated from the environment external of the package.

The invention also relates to a method of storing a lens wafer for use in fabricating a laminated ophthalmic lens, comprising the steps of:

1) providing a lens wafer; and 2) coating the lens wafer surface with a film to encapsulate the lens wafer therein whereby the lens wafer is maintained in a humidity environment which is substantially isolated from the environment external of the package.

The moisture content of the lens wafer at the time of encapsulation is not critical. If the moisture content is high and has caused changes in the lens wafer surface curvature, the lens wafer is preferably stored in the sealed package (or film) for a sufficient amount of time to permit the moisture level to stabilize and the curvature to return to near the post-cure value.

Preferably, the metal layer in the barrier package comprises metallic foil, particularly aluminum, and said sealable inner layer comprises a thermoplastic material such as low density polyethylene (LDPE), linear low density polyethylene (LLDPE), ionomers, and mixtures thereof. Optionally, the multilayer barrier material further comprises an outer protective layer comprising a puncture and abrasion resistant material selected from the group consisting of polyolefins (e.g., polypropylene, polyethylene and mixtures thereof), polyesters (e.g., polyethylene terephthalate), polyamides (e.g. nylons), halogenated polyolefins (e.g., polyvinyl chloride and polyvinylidene chloride and mixtures thereof), and mixtures thereof The multilayer barrier material of the package can further include one or more intermediate layer(s) each comprising a material selected from glues, thermoplastics, or mixtures thereof.

DETAILED DESCRIPTION OF THE PREFERRED EMBODIMENTS

The present invention is based in part on the discovery that the absorption of moisture is a significant factor causing changes in the interface surface curvature (or interface curvature) of lens wafers. Moreover, it has been found that, although the absolute values of the interface curvature changes appear to vary among different wafer configurations and wafer materials, there is a strong correlation between the humidity of the environment, the rate of change in moisture content of the wafers, and the departure from the original post-cure curvature value. By post-cure curvature is meant the curvature which exists following a period of heating which is commonly employed subsequent to removal of a lens wafer from its mould. Such heating is used in order to overcome process effects which change the wafer shape which can otherwise occur on removal of the wafer from its mold or in order to fully polymerize the wafer and its associated surface coatings.

Figure 1:
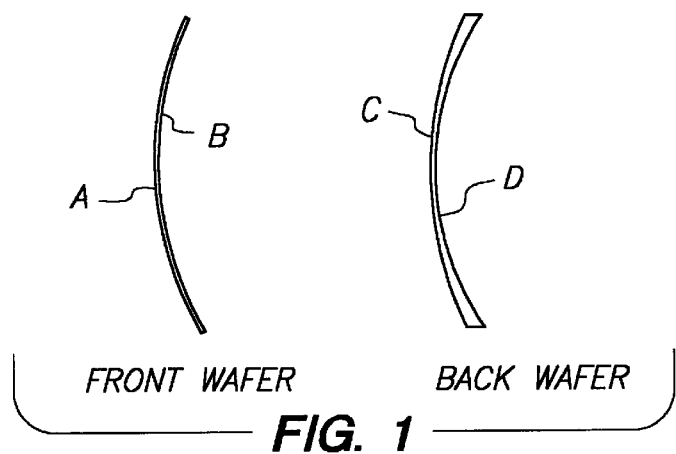
FIG. 1 is a cross-sectional view of a pair of lens wafers prior to lamination.

FIG. 1 depicts front and back wafer lens that can be bonded together by a thin layer of transparent adhesive to form a laminated lens. The front wafer has anterior surface A and posterior surface B. Similarly, the back wafer has anterior surface C and posterior surface D. Surfaces B and C are the interface curves with matching contours. In principal, both the anterior and posterior surfaces for any given lens wafer could serve as the bonding or interface surface. To assure that lamination produces ophthalmic lenses having the desired prescription, it is important that the lens wafer surfaces not become distorted from their original configurations. However, as illustrated by the structure of the back wafer, because the thickness of the lens wafer is not uniform the rate of moisture absorption will not be uniform. For example, the thin middle region of a minus power lens is more susceptible to fluctuations in the relative humidity as compared to the thicker outer region. Thus, once a lens wafer, with the desired interface curvature, i.e., optical power, is exposed to an environment where the relative humidity changes continuously, its surface curvature becomes unstable.

It is found that a lens wafer, when placed and then sealed into a package as described herein, exhibits significantly reduced curvature change (and hence power change after lamination). It has also been found that the use of such a package allows the moisture content of the lens wafer, and the curvature, to rapidly stabilize and equilibrate, irrespective of external conditions, with the curvature reaching a value which is close to its post-cure value, again irrespective of external conditions, or even the conditions prior to packaging. Thus, with the use of such a package it is possible to ensure that the lens wafer has its predicted shape, and hence the final overall power of the laminated lens which is produced has the desired value.

Accordingly, the invention provides a moisture barrier package, for the storage of lens wafers used in fabricating laminated lenses, comprising a package adapted to be sealed to enclose a lens wafer therein and formed of a multilayer material having a low rate of transmission of moisture, whereby conditions of humidity inside the sealed package are substantially isolated from humidity changes external of the package. As is apparent, the inventive barrier package can be used to store any article, however, the package is particularly suited for lens wafers, particularly plastic (e.g., polycarbonates, acrylate/methacrylates, and allyl carbonates) ones that are sensitive to moisture.

Figure 2:
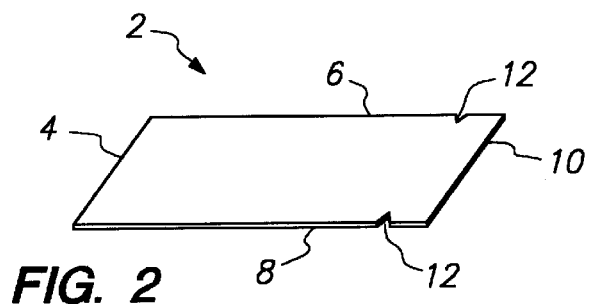
FIG. 2 is a sketch of a lens barrier package in accordance with the invention.

As illustrated in FIG. 2, the inventive moisture barrier package 2 is preferably formed from a sheet of barrier material that has been folded at edge 4 to create a pouch for storing a lens wafer. The sheet comprises a multilayer structure, as discussed in further detail below, with opposed faces of the sheet sealed together through a heat-seal, or by an adhesive, at the opposite long sides 6,8, of the package leaving an open end at 10. Oppositely disposed tear-notches 12 are provided adjacent the open end. Although the dimensions of the package are not critical, typical pouch dimensions for storing lens wafers are 11.4 cm (4½ in) in length, 8.9 cm (3½ in) minimum inside dimension and with 0.76 cm (³⁄₁₀th of an inch) maximum seal width. After insertion of a lens wafer into the package via the open end, the package is heat-sealed at the end 10 to form a sealed package enclosing the lens wafer. Opening of the package is facilitated by the oppositely disposed tear-notches 12. It will be appreciated that a variety of other package shapes may be employed, provided that, after sealing, the lens wafers are entirely enclosed within the package.

The material of the package comprises a multilayer structure which has a central layer of a metal foil, preferably of aluminum, although other metals such as gold may be employed. This is bonded to an outer protective puncture-resistant layer of a thermoplastic which also serves to support the fragile metal foil. This outer layer may carry a print for decorative or instructive purposes, which may be applied to the inwardly facing surface thereof which lies towards the metal foil. As further described below, the metal foil is particularly effective in controlling moisture penetration.

It is understood that while the multilayer structure of the package includes a "central" metallic layer, the structure is not limited to ones having an odd number of layers with the middle layer being made of metal.

The outer protective layer preferably comprises polyamides, polyolefins, halogenated polyolefins, or polyesters. Particularly preferred materials are nylon (e.g., nylon 66), polyvinyl chloride, polypropylene, polyethylene, or polyvinylidene chloride, e.g., Saran™ (available from DOW Chemical Co., Midland, Mich.). The outer protective layer may comprise one or more such layers.

On the opposite face of the metal foil is bonded a low melting point thermoplastic which allows the opposed inner faces of the package to be heat-sealed together. This inner layer may comprise, for example, low density polyethylene (LDPE) or linear low density polyethylene (LLDPE) or ionomers such as Surlyn™ (available from E. I. du Pont de Nemours & Co., Wilmington, Del.). This layer which is disposed inwardly of the package allows for heat sealing of the package. Ionomers are products of the neutralization of ethylene copolymers containing up to 5–10% acrylic or methacrylic acid copolymer with a metal salt such as the acetate or oxide of zinc, sodium, magnesium, barium, or aluminum.

The package material may comprise further one or more intermediate layer comprising glue or thermoplastics disposed between the outer protective layer and the metal foil and/or between the metal foil and inner heat-sealable thermoplastic layer. If a glue, this may comprise a pressure-sensitive adhesive such as acrylate. Such intermediate layers serve to further increase the package strength and integrity.

The thickness of each layer in the multilayer structure is not critical however each layer should comprise sufficient material so that the structure achieves the desired degree of moisture barrier protection and has the necessary structural integrity. As is apparent, the individual thicknesses will depend on, among other things, the overall thickness of the structure, the particular materials used, and the total number of layers present.

For constructing moisture barrier packages for plastic lens wafers, preferably the central metal layer has as a thickness of about 5 $\mu$m to about 120 $\mu$m and more preferably of about 6 $\mu$m to about 10 $\mu$m. Similarly, the outer protective layer preferably has as a thickness of about 10 $\mu$m to about 300 $\mu$m and more preferably of about 50 $\mu$m to about 100 $\mu$m; and, the inner layer preferably has as a thickness of about 10 $\mu$m to about 200 $\mu$m and more preferably of about 20 $\mu$m to about 100 $\mu$m; and, finally, each individual intermediate layer, when employed, preferably has as a thickness of about 10 $\mu$m to about 200 $\mu$m and more preferably of about 20 $\mu$m to about 100 $\mu$m. It is believed that aluminum foil contains pinholes if the foil is less than 0.0003 in (7.62 $\mu$m) thick and that the presence pinholes is deleterious to maintaining moisture protection.

Suitable moisture barriers of the present invention include, but are not limited to, packages, films, and containers, into which a lens wafer or other substrate is enclosed or encapsulated. The moisture barriers are constructed of moisture resistant materials preferably having a water vapor transmission rate that is less than about 0.05 grams/100 sq.in./day measured at 90% relative humidity (R. H.) and 100° F., preferably between about 0.005 to about 0.0005 grams/100 sq.in./day or less and more preferably between about 0.001 to about 0.0005 grams/100 sq. in./day or less. As is apparent, for storage of substrates in high humidity and/or high temperature environments, the moisture resistant materials should be selected from materials having the lower water vapor transmission rates.

For barrier packages for storing plastic lens wafers, the multilayer structure preferably has a water vapor transmission rate that is less than about 0.002 grams/100 sq.in./day measured at 90% relative humidity (R. H.) and 100° F. and preferably between about 0.001 to about 0.0005 grams/100 sq. in./day or less.

As is apparent, the number of individual layers in the multilayer structure for the moisture barrier package is not critical. Preferably, the multilayer structure has 3 to 12 layers. A 3 layer structure most preferably comprises a heat-sealable inner layer, a metal layer, and a puncture-resistant outer layer. As described above, the multilayer structure can optionally include adhesives (e.g., glue) that are employed to bind adjacent layers together and to keep the multilayer structure intact.

A preferred moisture barrier package with a central layer of aluminum has a five-layer structure comprising:

1. an inner heat-sealable layer of Surlyn™;
2. a first intermediate layer of polyethylene positioned between the aluminum and Surlyn™;
3. a central aluminum foil;
4. a second intermediate layer of polyethylene bonded to the aluminum; and
5. an outer protective nylon layer.

Another preferred moisture barrier package with a central layer of aluminum has a five-layer structure comprising:

1. an inner layer of linear low density polyethylene;
2. a first intermediate layer of polyethylene positioned between the aluminum and the inner layer;
3. a central aluminum foil;
4. a second intermediate layer of polyethylene bonded to the aluminum; and
5. an outer protective layer of polyethylene terephthalate.

The molecular weights of the polymers which are employed as the thermoplastic material for the sealable inner layer and the outer protective layer are not critical. The main criterion is that the multilayer structure formed therefrom is substantially water impermeable as defined by the water vapor transmission rate.

Experimental

Tests were conducted to compare and evaluate the effectiveness of packages fabricated from different multilayer structures designated Types A through G. The following lists the composition and thickness of each layer of the structure commencing from the outer side of the package.

Type A - 5-layer film:
1) 25 $\mu$m thickness (100 gauge) biax nylon;
12) 15# polyethylene;
3) 18 $\mu$m (0.0007 in.) aluminum foil;
4) 18# polyethylene;
5) 44 $\mu$m (1.75 mil) Surlyn™.

Type B - 4-layer film:
1) 50# paper;
2) 10# polyethylene;
3) 127 $\mu$m (0.005 in.) aluminum foil;
4) 18# polyethylene.

Type C - 6-layer film;
1) 25 µm (100 gauge) nylon;
2) 10# polyethylene;
3) 51 µm (2 mil) high barrier film;
4) 10# polyethylene;
5) 10# polyethylene;
6) 64µm (2.5 mil) linear low density polyethylene.

Type D - 3-layer film:
1) 12 µm (48 gauge) polyethylene terephthlate;
2) 7# polyethylene;
3) 38 µm (1.5 mil) linear low density polyethylene.

Type E - 4-layer film:
1) 12.5 µm (50 gauge) oriented polypropylene;
2) 7# white polyethylene;
3) 7.2 µm (0.00285 in.) aluminum foil;
4) 21# linear low density polyethylene co-extrusion.

Type F - 5-layer film:
1) 25 µm (100 gauge) biax nylon;
2) 15# polyethylene;
3) 7.6 µm (0.0003 in.) aluminum foil;
4) 15# polyethylene;
5) 50 µm (200 gauge) linear low density polyethylene.

Type G - 5-layer film:
1) 12 µm (48 gauge) polyethylene terephthlate;
2) 12# white polyethylene;
3) 7.6 µm (0.0003 in.) aluminum foil;
4) 12# polyethylene;
5) 38 µm (1.5 mil) linear low density polyethylene Test 1 (Measuring packages for water permeability and effect on lens interface curvatures). In Test 1, Phase 1, a variety of lens wafers made from polymers based on allyl diglycol carbonate monomers, (available as CR-39™ from PPG Industries, Inc., Hartford, Conn.) of various optical specifications previously stored at ambient temperature and humidity conditions for a period of about eight weeks was employed. Lens types including −2.00 D spherical lens backs and progressive-type lens fronts were examined, some of which included anti-reflection coatings. The lens wafers were placed in a dry oven at 50° C. for approximately three hours to drive out moisture. After the components had cooled sufficiently (about fifteen to twenty minutes) the interface curvatures, and water content (through weight) were measured. Three to four wafers were placed in packages of the type shown in FIG. 2, but constructed with materials of Type A through Type G, and these were sealed with a conventional heat-sealing device. (The lens wafers were individually packaged.) Such a device may be an impulse type sealer which employs a temperature of about 250° C. for a few seconds or a bar type sealer which seals at a lower temperature of about 150° to 200° C. for a longer period, both employing about 10 psi. Six wafers were left unpackaged as controls. Packaged and unpackaged wafers were stored in an oven held at 25° C. and partially filled with water to create an environment with around 70% relative humidity. It has previously been found by the applicant that the most significant curve changes occur between twenty four and forty eight hours of packaging, and the wafers in this test were therefore unpackaged and remeasured after two days. The material that performed most successfully was then compared with three other barrier materials in Phase 2 as discussed below,.

Table 1 gives the results of the test and indicates the shift in moisture content (percentage moisture content) and interface curvature (measured in diopters). What is readily apparent is that the unpackaged lens wafers exhibited significant moisture absorption and curvature change. The Type A material performed most effectively in limiting moisture absorption and curvature change, although each of Types B, C and D was still effective although to a lesser degree.

TABLE 1

| Pkg Type | Wafer | % H₂O Content Before | % H₂O Content After | Diff | Interface Curvature Before | Interface Curvature After | Diff |
| --- | --- | --- | --- | --- | --- | --- | --- |
| NONE | −2.00 | .0192 | .4261 | 0.41 | 5.87 | 6.04 | 0.17 |
| NONE | −2.00 | .0270 | .4666 | 0.44 | 5.86 | 6.21 | 0.35 |
| A | HC −2.00 | .0272 | .0974 | 0.07 | 6.05 | 6.05 | 0.00 |
| A | AR −2.00 | .0197 | .0684 | 0.05 | 5.73 | 5.79 | 0.06 |
| A | HC −2.00 | .0386 | .0983 | 0.06 | 5.88 | 6.01 | 0.13 |
| A | HC PROG | .0142 | .0695 | 0.06 | 5.99 | 5.99 | 0.00 |
| B | HC −2.00 | .0075 | .1734 | 0.17 | 5.85 | 5.94 | 0.09 |
| B | HC −2.00 | .0282 | .2332 | 0.21 | 5.88 | 6.05 | 0.17 |
| B | HC −2.00 | .0257 | .1715 | 0.15 | 5.99 | 6.10 | 0.11 |
| C | HC PROG | .0200 | .1435 | 0.12 | 5.96 | 5.96 | 0.00 |
| C | HC PROG | .0233 | .1773 | 0.15 | 5.91 | 6.03 | 0.12 |
| C | UN −2.00 | .0180 | .1442 | 0.13 | 5.85 | 5.88 | 0.03 |
| D | UN −2.00 | .0150 | .1994 | 0.18 | 5.86 | 5.93 | 0.07 |
| D | UN −2.00 | .0157 | .1978 | 0.18 | 5.86 | 5.95 | 0.09 |
| D | UN −2.00 | .0128 | .2143 | 0.20 | 5.89 | 6.00 | 0.11 |
| D | UN PROG | .0159 | .2287 | 0.21 | 5.96 | 6.11 | 0.15 | where HC denotes hard coated
AR denotes anti-reflection coated
UN denotes uncoated
PROG denotes a progressive type lens wafer In Phase 2, a further test was conducted to evaluate materials Types E, F and G in comparison to material Type A and to the unpackaged controls. Similar procedures were followed as described above for Test 1, Phase 1, with the exception of the drying process in which components were placed in an oven at 100° C. for about an hour. Hard (abrasion resistant) coated and uncoated −2.00 D (interface curve) lens wafer backs were used. The results of Test 1 Phase 2 are shown in Table 2.

TABLE 2

| Pkg Type | Wafer | % H₂O Content Before | % H₂O Content After | Diff | Interface Curvature Before | Interface Curvature After | Diff |
| --- | --- | --- | --- | --- | --- | --- | --- |
| NONE | −2.00 | .0333 | .4175 | 0.38 | 5.87 | 6.28 | 0.41 |
| NONE | HC −2.00 | .0292 | .4568 | 0.43 | 6.03 | 6.40 | 0.37 |
| NONE | UN −2.00 | .0145 | .4574 | 0.44 | 5.84 | 6.30 | 0.46 |
| A | HC −2.00 | .0268 | .0825 | 0.06 | 5.84 | 5.91 | 0.07 |
| A | UN −2.00 | .0421 | .0872 | 0.05 | 5.75 | 5.94 | 0.19 |
| A | HC −2.00 | .0635 | .0884 | 0.02 | 6.06 | 6.09 | 0.03 |
| E | UN −2.00 | .0202 | .0795 | 0.06 | 5.79 | 5.98 | 0.19 |
| E | HC −2.00 | .0251 | .1157 | 0.09 | 6.02 | 6.12 | 0.10 |
| E | UN −2.00 | .0102 | .0746 | 0.06 | 5.78 | 5.96 | 0.18 |
| F | UN −2.00 | .0047 | .0850 | 0.08 | 5.80 | 5.95 | 0.15 |
| F | HC −2.00 | .0423 | .0960 | 0.05 | 6.04 | 6.11 | 0.07 |
| F | HC −2.00 | .0592 | .0722 | 0.01 | 5.99 | 6.08 | 0.09 |
| G | HC −2.00 | .0425 | .0755 | 0.03 | 6.04 | 6.12 | 0.08 |
| G | UC −2.00 | .0079 | .0483 | 0.04 | 5.82 | 5.85 | 0.03 |
| G | UC −2.00 | .0081 | .0666 | 0.06 | 5.79 | 5.91 | 0.12 |

As can be seen from this Table, packages of material Type A, F, and G (each comprising a 5-layer film) performed equally well in terms of moisture absorption and curve drift, and demonstrated a significant reduction in moisture content and curvature change as compared to the unpackaged wafers, while material Type E (a 4-layer film) was only slightly less effective.

The data suggests that an important criterion for the effectiveness of the barrier packages is the rate at which the materials allow water vapor to pass through. For a material comprising solely a two layer structure PET and PE layers, this rate is of the order of 0.005 grams/m²/day (measured at conditions of 90° C. and 100% relative humidity). This contrasts with a typical value of the order of 0.0006 grams/m²/day for a metal foil-containing material, such as is exemplified by material types A, B, E, F and G.

An examination of the data in Table 2 for the three lens wafers that were not packaged reveals that coating a wafer with a hard abrasion resistant coating (e.g., film) afforded some moisture protection. The coating reduced the amount of change in the interface curvature as compared to uncoated wafers. The abrasion resistant coatings can be fabricated from inorganic or organic materials, or a combination of both materials. Inorganic materials include, for example, metal oxides, e.g., silicon dioxide and titanium dioxide, and have thicknesses preferably ranging from about 0.1 µm to about 2 µm, and more preferably from about 0.25 µm to about 1 µm. Organic materials include, for example, siloxane, acrylic or vinyl based compounds, and have thicknesses preferably ranging from about 0.5 µm to about 20 µm, and more preferably from about 1 µm to about 5 µm. It is expected that a thicker abrasion resistant coating having a water vapor transmission rate comparable to that of the barrier package can be employed to encapsulate lens wafers. One advantage of employing a moisture barrier coating instead of a moisture barrier package is that if the coating does not interfere with the optical properties of the lens wafer (more specifically, the optical properties of the laminated lens formed from two lens wafers) then the coating does not have to be removed prior to lamination.

Moisture barriers in the form of film coatings are constructed of moisture resistant films preferably having a water vapor transmission rate that is less than about 0.05 grams/100 sq.in./day measured at 90% relative humidity (R. H.) and 100° F., preferably between about 0.005 to about 0.0005 grams/100 sq.in./day or less and more preferably between about 0.001 to about 0.0005 grams/100 sq. in./day or less. As is apparent, for storage of substrates in high humidity and/or high temperature environments, the moisture resistant materials should be selected from materials having the lower water vapor transmission rates.

For encapsulating plastic lens wafers, the film coating preferably has a water vapor transmission rate that is less than about 0.002 grams/100 sq.in./day measured at 90% relative humidity (R. H.) and 100° F. and preferably between about 0.001 to about 0.0005 grams/100 sq. in./day or less.

As is apparent, coating the lens wafer with a moisture barrier can provide moisture equilibrated lens wafers. Furthermore, a coated lens wafer can be stored in an inventive moisture package for additional moisture protection.

To further examine the effectiveness of barrier packaging materials, tests were conducted to ascertain the performance over a more extended period of time, and in particular whether any stabilization of curvature occurs, and whether this is affected by the initial moisture content at the time of packaging, and the time interval between formation of the lens wafer and sealing the lens wafer within a barrier package. All lens wafers were made from CR-39™.

Test 2 Thirty-six unpackaged wafers in the form of sphere backs were placed in three separate environments with different relative humidity conditions; namely, a vacuum oven with a double stage pump to simulate approximately 0% relative humidity, a room which routinely demonstrated humidity levels near 30%, and a laboratory oven held at 25° C. and partially filled with water to produce a 70% relative humidity condition. Over a period of two weeks wafers were removed every few days and evaluated for water content, weight and curvature changes.

Figure 3:
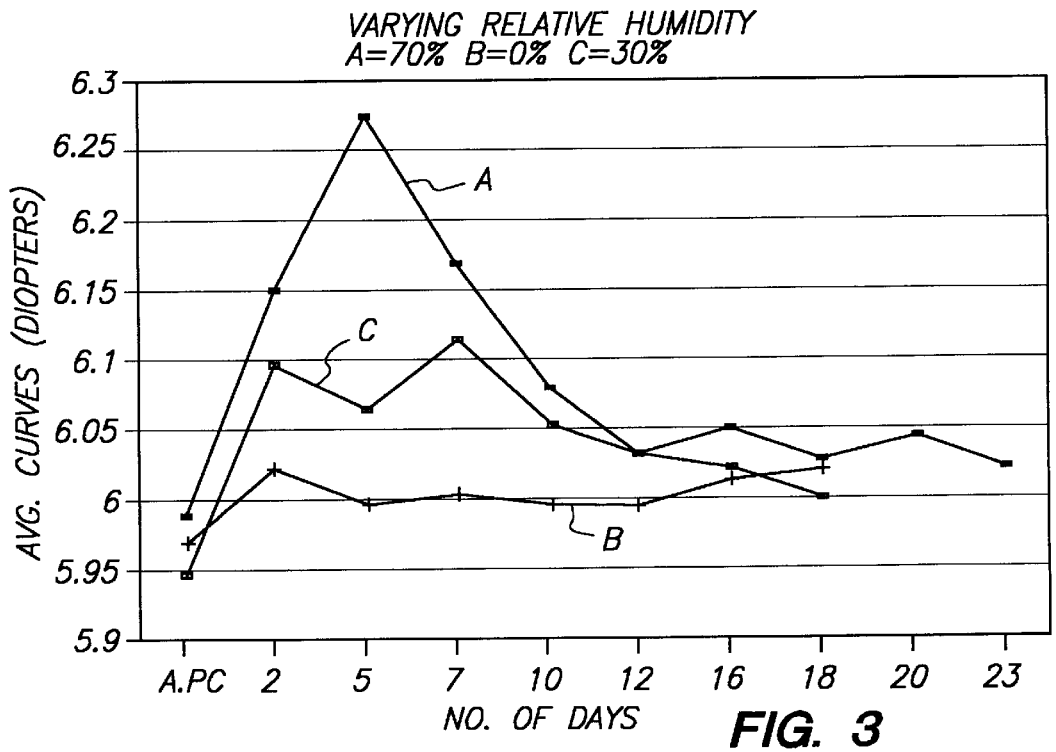
FIG. 3 is a graph showing the change of curvature of unpackaged lens wafers for varying humidity levels, as investigated in Test 2.
Figure 4:
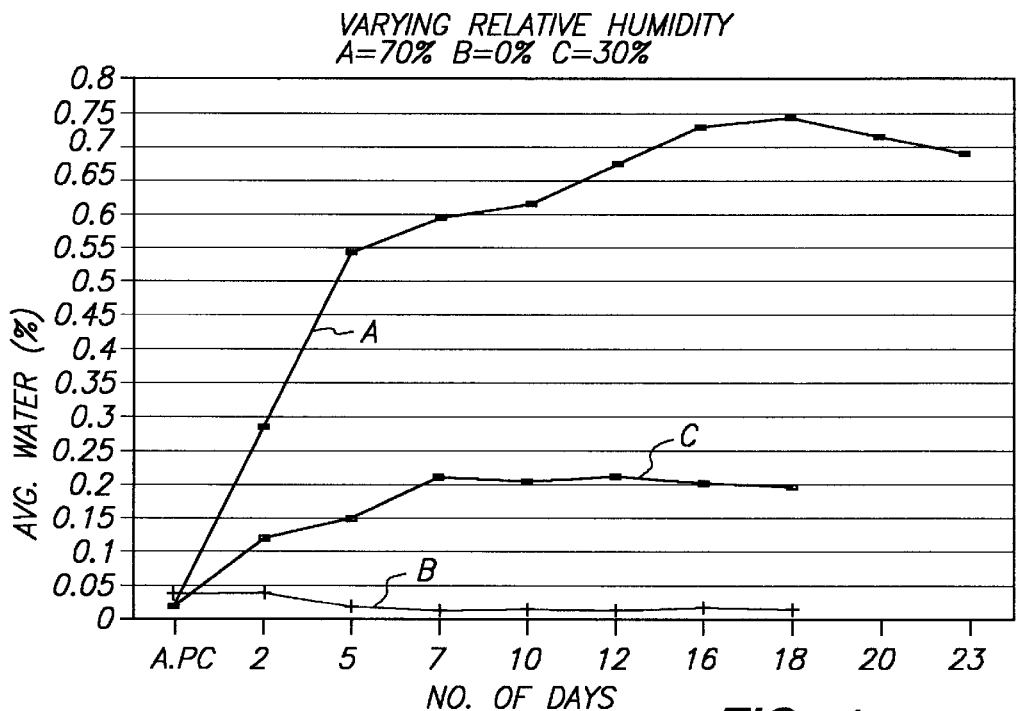
FIG. 4 is a graph showing the effect of varying humidity levels on the water content of unpackaged lens wafers, as investigated in Test 2.

The results of this test are shown in FIGS. 3 and 4. These graphs show that the lens wafers reach a stable condition in terms of moisture and curvature. Wafers in zero humidity displayed stable central curvature from day two onwards, while wafers in 30% and 70% relative humidity showed steepening of the curvatures and then flattening. After about twelve days the interface curvatures on wafers on all three environments had returned to within 0.05 D of their curvature values after post cure.

Figure 5:
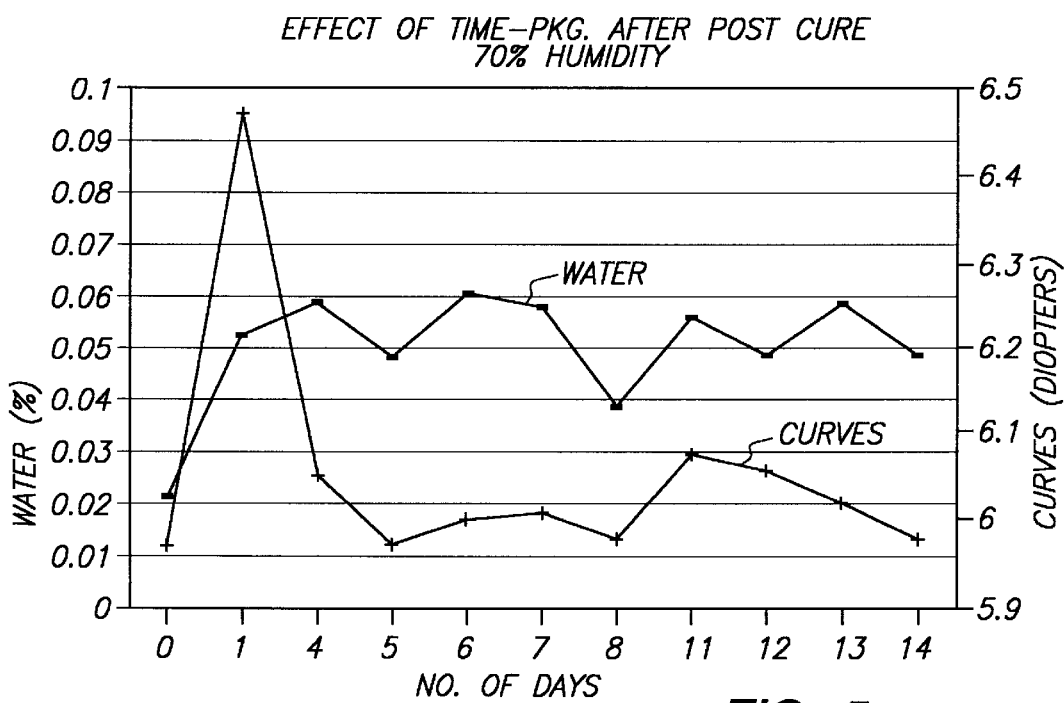
FIG. 5 is a graph showing the changes of curvature and water content with time of a lens wafer packaged in a barrier package, as investigated in Test 3.

Test 3 Ten −2.00 D wafers were packaged in Type A or similar barrier materials and placed in a 70% relative humidity environment. One package a day (with the exception of weekends) was removed, opened and measured to track changes in curvature and moisture content. The results which are shown in FIG. 5 show that after packaging, the lens water content almost immediately stabilized near 0.05% (moisture content being 0.02% prior to packaging). The interface curvatures steepened during the first day after packaging, and then equilibrated to within 0.05 D of their after post-cure curvature values at a time between day one and day four. (For this graph the values at time zero are averages of all the lenses.)

Figure 6:
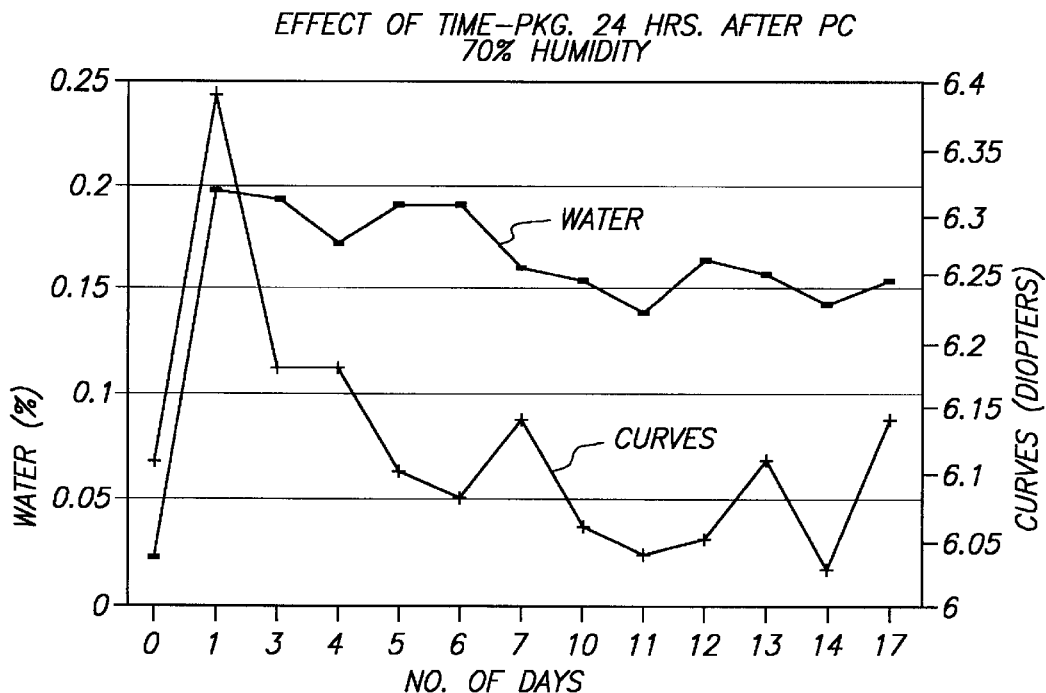
FIG. 6 is a graph showing the changes of curvature and water content with time of a lens wafer packaged in a barrier package, as investigated in Test 4.

Test 4 Ten −1.75 D to −1.00 D (Toric) wafers were allowed to absorb moisture for 24 hours to about 0.2% prior to packaging in a Type A or similar material. The packages were stored in the accelerated aging environment at 70% relative humidity and, with the exception of weekends, one wafer was removed and measured daily. The results shown in FIG. 6 indicate that after packaging, the moisture content slowly decreased, showing some sign of stabilization at about 0.15% after about ten days, while the curvatures flattened for approximately 10 days and then stabilized. (For this graph, at time zero and one day, the values are averages of all the unpackaged lenses.)

As is apparent, the data establish that lens wafers stored in an environment where the humidity is static will equilibrate so that the moisture content therein will be distributed evenly. Moreover, the lens wafers once equilibrated will maintain their interface curvatures. Conversely, lens wafers stored in a dynamic environment where the humidity changes continuously will experience fluctuations in their interface curvatures.

Figure 7:
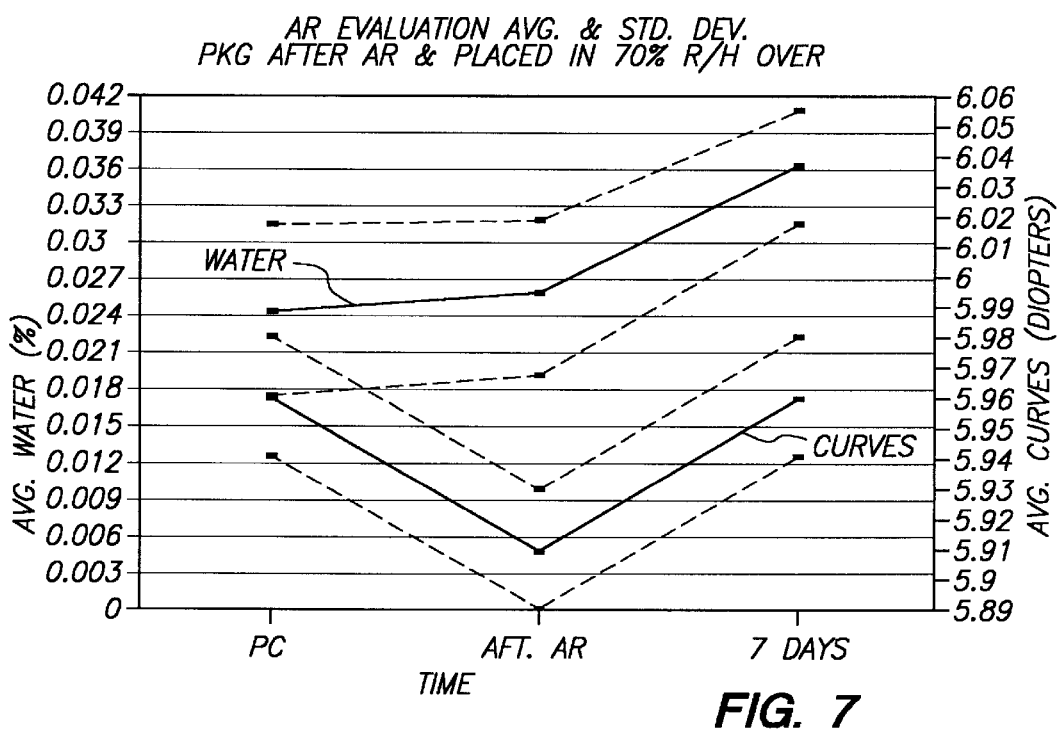
FIG. 7 is a graph showing the changes of curvature and water content with time of lens wafers packaged in a barrier package, as investigated in Test 5.

Test 5 Ten anti-reflection coated −1.75 to 1.25 D (Toric) wafers were enclosed in barrier material packages of Type A, sealed and stored in the 70% relative humidity oven with the wafers removed from the packages and measured after seven days. The results of this test are shown in FIG. 7, in which the average values are plotted together with the standard deviations. (The upper and lower limits of the standard derivation for the average water (i.e., moisture) and average curvature (i.e., diopter) are shown immediately above and below the average water and average curve values.) As is apparent, after seven days in the barrier packages the average interface curvatures had returned to their original post cure values, and the average moisture content increased by 0.05%. The distribution of change was modest for both moisture content and for the lens curvatures.

Test 6 Fifty-four minus sphere backs, thirty-six minus toric backs and fifty-four progressive-type fronts were cast for this test. Measurements of moisture content and wafer curvature were made following "post-cure" with sixteen parts then immediately placed in the 70% relative humidity oven, of which half were enclosed in barrier packages based on type A material and half left unpackaged. The remaining one hundred and twenty eight wafers were divided into two groups placed respectively in 40% and 65% relative humidity environments to absorb various levels of moisture prior to packaging. Six front and ten back lens wafers were taken from each "hold environment" at a period of fifteen, eighteen, twenty-one or twenty-four hours after post-cure. At each stage the wafers were measured, half were packaged and all were placed in the 70% relative humidity oven. Forty-eight hours later they were all removed and measured to determine the amount of moisture content and curvature change.

Figure 8:
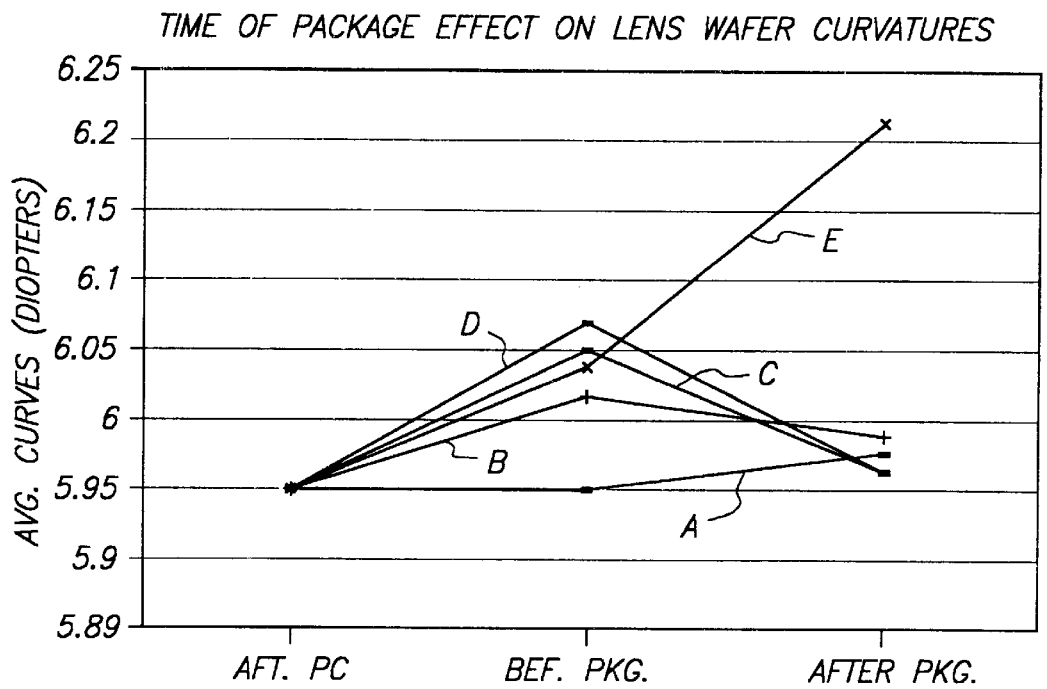
FIG. 8 is a graph showing the changes in curvature of a lens wafer packaged in a barrier package as the time prior to packaging is varied and with 40% relative humidity, as investigated in Test 6.
Figure 9:
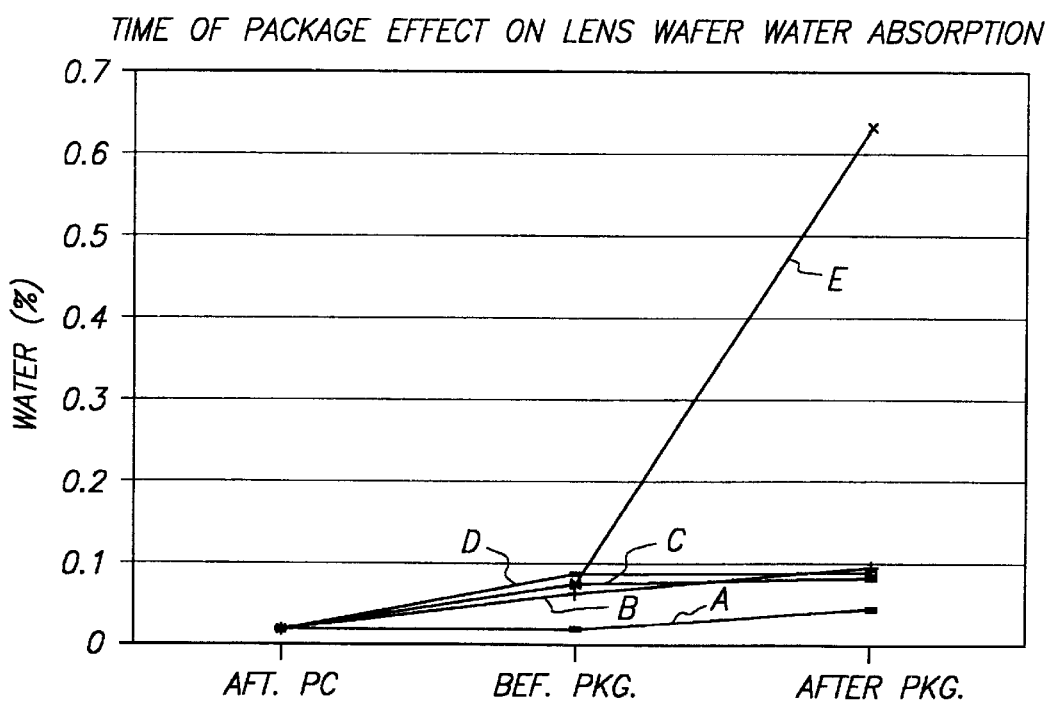
FIG. 9 is a graph showing the changes in water content of a lens wafer packaged in a barrier package as the time to packaging is varied, as investigated in Test 6.

The results of a test for lens backs held at 40% relative humidity are shown in FIGS. 8 and 9. These graphs show the change in curvature (FIG. 8) and moisture levels (FIG. 9) between post-cure and the period just prior to packaging and then between packaging a period forty eight hours later when subjected to humid conditions (40%). (For FIGS. 8 and 9, curves A, B, C and D are the measurements for wafers packaged (1) immediately after post-cure; (2) after 15 hours, (3) after 21 hours and (4) after 24 hours, respectively. Curve E is for the control unpackaged wafers that were placed in the 70% R. H. oven after 21 hours. As is apparent, as packaging time is delayed, the wafer absorbs moisture and the average interface curve steepens. Once in the package the moisture essentially stabilizes and the curvature flattens to near the after post-cure value. This indicates that the moisture content at the time of packaging is not critical.

Although the absolute values of curvature and moisture content varied for the different wafer configurations and relative humidity conditions in the test, all the results obtained show a common trend adequately exemplified by the graphs of FIGS. 8 and 9.

The results of Tests 3 to 6 demonstrate that the use of the barrier package significantly limits the amount of water adsorbed by the wafers (compared with Test 2) and allows rapid stabilization of the curvature to a value which is independent of the initial water content of the wafer and packaging environment, and is close to the post-cure value of the wafer. The results also show that the period of time between wafer cure and packaging is not critical. Thus, with the present invention, it is not necessary to heat (or employ other techniques) to remove moisture from the lens wafer prior to storage in the inventive barrier package.

It is found that the barrier materials exhibiting a typical transmission rate of 0.0006 grams/m$^2$/day or lower give rise to a rapid curvature stabilization, typically to within a value of +2% of the post-cure value within a ten day period. This deviation range is found to be generally acceptable in terms of producing fixed laminated lenses of acceptably consistent power. While not intending to be limited by any particular theory, it is believed that when the lens wafers are unpackaged, humidity changes lead to differential moisture absorption across the wafer, which is higher at the center of high minus lenses and at the edges of positive lenses, leading to differential stresses and shape distortion. These stresses and distortion are relieved once the lens wafer has reached an equilibrium condition through the wafer in terms of water content. The use of the barrier package which substantially isolates the environment inside the package from the external environment allowing only a very low rate of moisture ingress, allows a rapid equilibration of moisture through the lens wafers, allowing the wafers to rapidly assume and maintain their intended curvatures, irrespective of external conditions.

As is apparent, with the present inventive method for storing lens wafers, especially polymeric ones, the particular sealable packaging material used is not critical. The primary criterion is that the packaging material demonstrates low water vapor permeability under the storage conditions, e.g., temperature and relative humidity. Although each lens wafer for the above experiments was individually stored in a barrier package, it is understood that each barrier package can be designed to accommodate two or more lens wafers.

The subject matter disclosed herein is also disclosed in the priority British Patent Application No. 9403829.6, which is incorporated herein by reference in its entirety.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A packaged plastic lens wafer suitable for forming a laminated lens when bonded to a second plastic lens wafer which packaged plastic lens wafer comprises:
   (a) a package formed of a substantially water impermeable material which package is a moisture barrier that has a water vapor transmission rate that is less than 0.05 grams/100 sq. in./day at 90% relative humidity and 100° F.; and
   (b) a plastic lens wafer enclosed within said package wherein said plastic lens wafer is removable from said package and wherein the plastic lens wafer is maintained in an environment which initially has a relative humidity of at least 30% and which is substantially isolated from the environment external of the package.

2. The packaged lens wafer according to claim 1 wherein the package is a moisture barrier that has a water vapor transmission rate that is less than 0 0.002 grams/100 sq. in./day at 90% relative humidity and 100° C.

3. The packaged lens wafer according to claim 1 wherein said package is a moisture barrier which is formed of metal oxides and has a thickness of 0.1 μm to 0 2 μm.

4. The packaged lens wafer according to claim 1 wherein said package is a moisture barrier which is formed from a material selected from siloxane, acrylic, and vinyl based compound, and has a thickness of 0 0.5 μm to 20 μm.

5. The packaged lens wafers according to claim 1 wherein the water impermeable material comprising a metal layer and a sealable inner layer.

6. The packaged lens wafer according to claim 1 wherein said package is a moisture barrier that has a water vapor transmission rate that is less than about 0.002 grams/100 sq. in./day at 90% relative humidity and 100° F.

7. The packaged lens wafer according to claim 5 wherein said metal layer comprises metallic foil, wherein said sealable inner layer comprises a thermoplastic material, and wherein the impermeable material further comprises an outer protective layer.

8. The packaged lens wafer according to claim 7 wherein said outer protective layer comprises a puncture and abrasion resistant material selected from the group consisting of polyolefins, polyesters, and mixtures thereof.

9. The packaged lens wafer according to claim 7 wherein said outer protective layer comprises a puncture and abrasion resistant material selected from the group consisting of nylon, polyethylene terephthalate, polyvinyl chloride, polypropylene, polyethylene, polyvinylidene chloride, and mixtures thereof.

10. The packaged lens wafer according to claim 7 wherein said sealable inner layer comprises a thermoplastic selected from the group consisting of low density polyethylene (LDPE), linear low density polyethylene (LLDPE), ionomers, and mixtures thereof.

11. The packaged lens wafer according to claim 7 wherein the metallic foil comprises aluminum.

12. The packaged lens wafer according to claim 1 wherein said water impermeable material comprises a five-layer structure that comprises in sequence:

(1) an outer protective layer of nylon;
(2) a first layer of polyethylene;
(3) a layer of aluminum foil;
(4) a second layer of polyethylene; and
(5) an inner layer of ionomers.

13. The packaged lens wafer according to claim 1 wherein said water impermeable material has a five-layer structure that comprises in sequence:

(1) an outer layer of nylon;
(2) a first layer of polyethylene;
(3) a layer of aluminum foil;
(4) a second layer of polyethylene; and
(5) an inner layer of linear low density polyethylene.

14. The packaged lens wafer according to claim 1 wherein said water impermeable material has a five-layer structure that comprises in sequence:

(1) an outer layer of polyethylene terephthalate;
(2) a first layer of polyethylene;
(3) a layer of aluminum foil;
(4) a second layer of polyethylene; and
(5) an inner layer of linear low density polyethylene.

15. The packaged lens wafer according to claim 1 wherein the plastic lens wafer is made of material selected from the group consisting of polycarbonates, acrylates, methacrylates, and allyl carbonates.

16. The packaged lens wafer according to claim 1 wherein the relative humidity initially is at least 40%.

17. The packaged lens wafer according to claim 1 wherein the relative humidity initially is at least 65%.

18. The packaged lens wafer according to claim 1 wherein the relative humidity initially is at least 70%.

19. A method of storing a plastic lens wafer for use in fabricating a laminated ophthalmic lens, comprising the steps of:

(a) providing a package formed of a substantially water impermeable material that defines a sealable pocket adapted to enclose the plastic lens wafer therein;
(b) inserting the plastic lens wafer inside said pocket which contains water vapor; and
(c) sealing the pocket to enclose the plastic lens wafer therein whereby the plastic lens wafer is maintained in an environment which contains water vapor and which is substantially isolated from the environment external of the package wherein said plastic lens wafer is removable from said package and wherein the relative humidity inside said pocket immediately before sealing the pocket is at least 30%.

20. A method according to claim 19 wherein the package comprises: a multilayer barrier material comprising a metal layer and a sealable inner layer, said multilayer barrier material defining a sealable pocket adapted to enclose the lens wafer therein, said multilayer barrier material having a water vapor transmission rate that is less than 0.05 grams/100 sq. in./day at 90% relative humidity and 100° F.

21. A method according to claim 19 wherein the package comprises: a multilayer barrier material comprising a metal layer and a sealable inner layer, said multilayer barrier material defining a sealable pocket adapted to enclose the lens wafer therein, said multilayer barrier material having a water vapor transmission rate that is less than 0.002 grams/100 sq. in./day at 90% relative humidity and 100° F.

22. A method according to claim 20 wherein said metal layer comprises metallic foil, wherein said sealable inner layer comprises a thermoplastic material, and wherein the multilayer barrier material further comprises an outer protective layer.

23. A method according to claim 22 wherein said outer protective layer comprises a puncture and abrasion resistant material selected from the group consisting of polyamides, halogenated polyolefins, polyolefins, polyesters, and mixtures thereof.

24. A method according to claim 22 wherein said outer protective layer comprises a puncture and abrasion resistant material selected from the group consisting of nylon, polyethylene terephthalate, polyvinyl chloride, polypropylene, polyethylene, polyvinylidene chloride, and mixtures thereof.

25. A method according to claim 22 wherein said sealable inner layer comprises a thermoplastic selected from the group consisting of low density polyethylene (LDPE), linear low density polyethylene (LLDPE), ionomers, and mixtures thereof.

26. A method according to claim 22 wherein the metallic foil comprises aluminum.

27. A method according to claim 20 wherein said multilayer barrier material comprises a five-layer structure that comprises in sequence:

(1) an outer protective layer of nylon;
(2) a first layer of polyethylene;
(3) a layer of aluminum foil;
(4) a second layer of polyethylene; and
(5) an inner layer of ionomers.

28. A method according to claim 20 wherein the multilayer barrier material has a five-layer structure that comprises in sequence:

(1) an outer layer of nylon;
(2) a first layer of polyethylene;
(3) a layer of aluminum foil;
(4) a second layer of polyethylene; and
(5) an inner layer of linear low density polyethylene.

29. A method according to claim 20 wherein the multilayer barrier material has a five-layer structure that comprises in sequence:

(1) an outer layer of polyethylene terephthalate;
(2) a first layer of polyethylene;
(3) a layer of aluminum foil;
(4) a second layer of polyethylene; and
(5) an inner layer of linear low density polyethylene.

30. A method according to claim 19 wherein the plastic lens wafer prior to being enclosed in step c is defined by a first interface curvature measurement and said method further comprises the steps of (d) storing the plastic lens wafer in the pocket and thereafter (e) removing the plastic lens wafer from the pocket wherein the plastic lens wafer is stored for a sufficient length of time so that the the plastic lens wafer upon removal has an interface curvature that is substantially equal to the first interface curvature measurement.

31. A method according to claim 19 wherein the plastic lens wafer is enclosed in the pocket for a sufficient length of time to permit the plastic lens wafer to stabilize so that its interface curvature is substantially equal to its post-cure curvature.

32. A method according to claim 19 wherein the plastic lens wafer is enclosed for at least 12 days.

33. The method according to claim 19 wherein the plastic lens wafer is made of material selected from the group consisting of polycarbonates, acrylates, methacrylates, and allyl carbonates.

34. A method according to claim 19 wherein the relative humidity inside said pocket immediately before sealing the pocket is at least 40%.

35. A method according to claim 19 wherein the relative humidity inside said pocket immediately before sealing the pocket is at least 65%.

36. A method according to claim 19 wherein the relative humidity inside said pocket immediately before sealing the pocket is at least 70%.

* * * * *